Nov. 24, 1970  N. J. PETERS  3,541,687
VERTICAL CHEESE MAKING UNIT
Filed Feb. 26, 1968  4 Sheets-Sheet 1
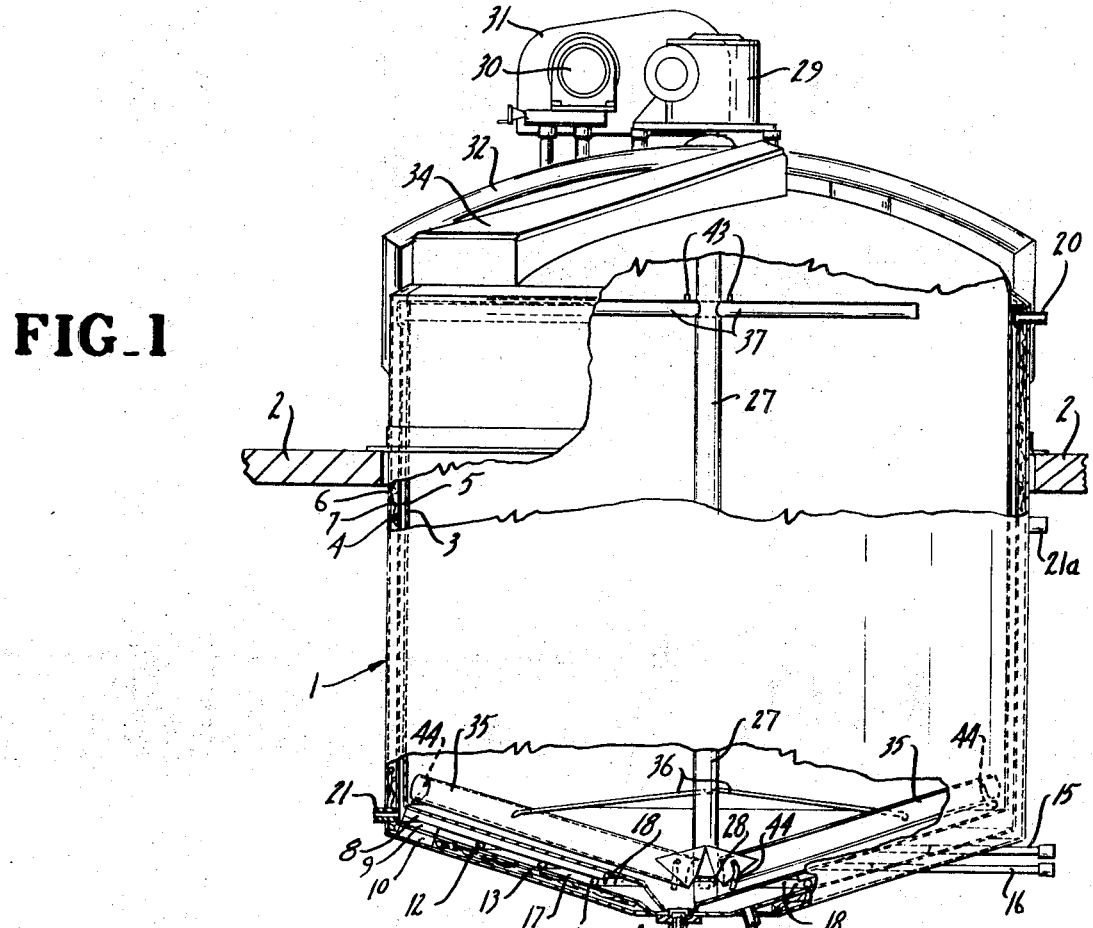
FIG_1
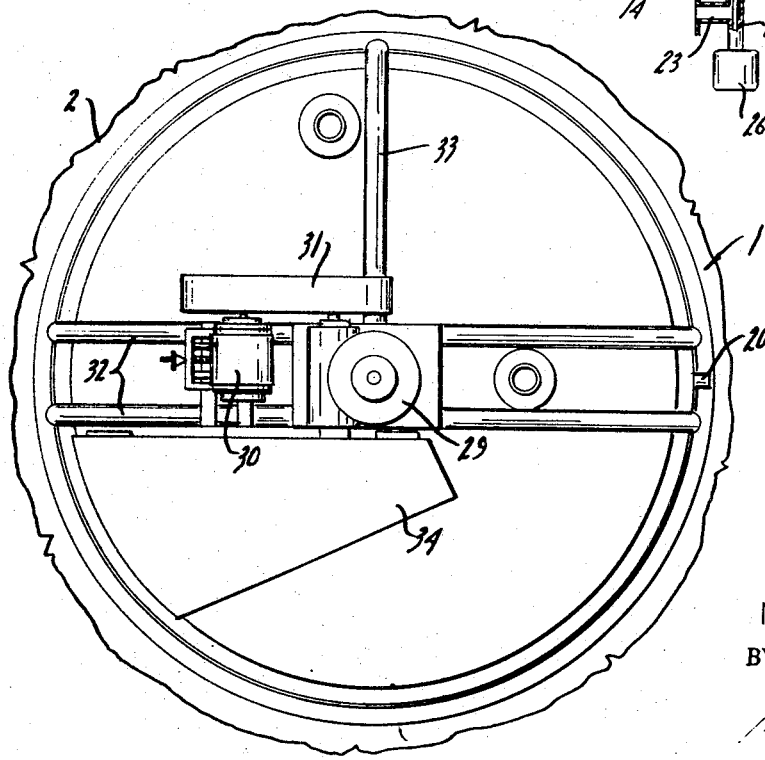
FIG_2
INVENTOR.
NORMAN J. PETERS
BY
Andrus & Starke
Attorneys Nov. 24, 1970 N. J. PETERS 3,541,687
VERTICAL CHEESE MAKING UNIT
Filed Feb. 26, 1968 4 Sheets-Sheet 2
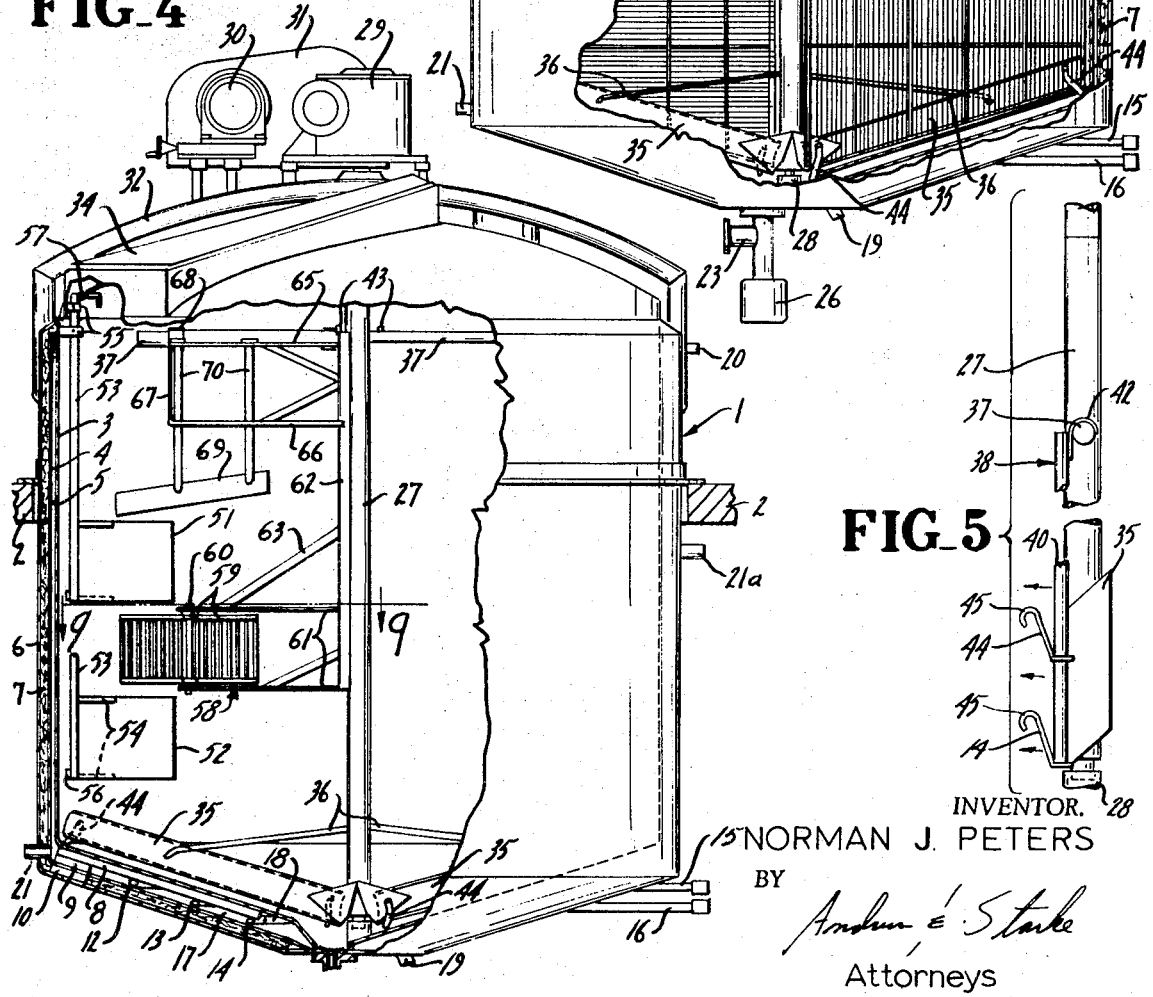
INVENTOR.
NORMAN J. PETERS
BY
Andrew E. Starke
Attorneys

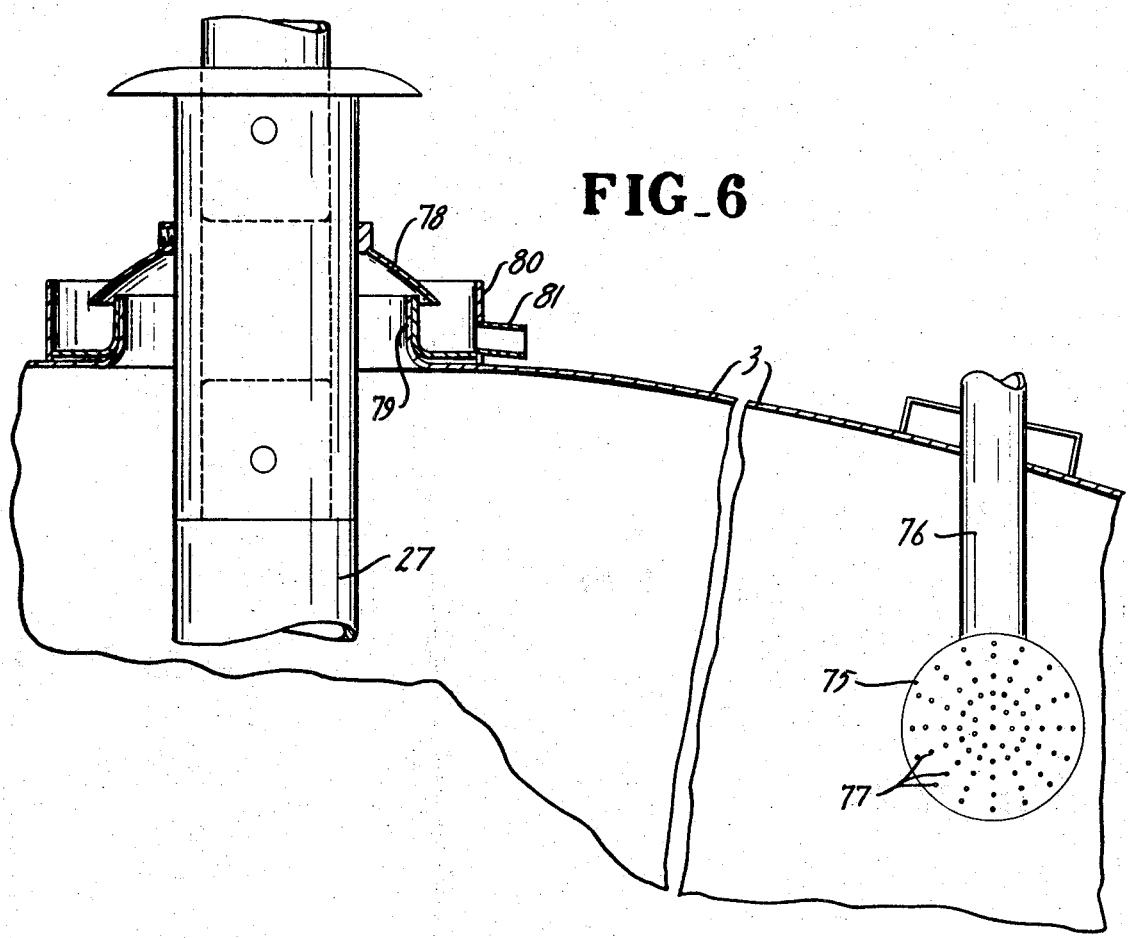
FIG_6
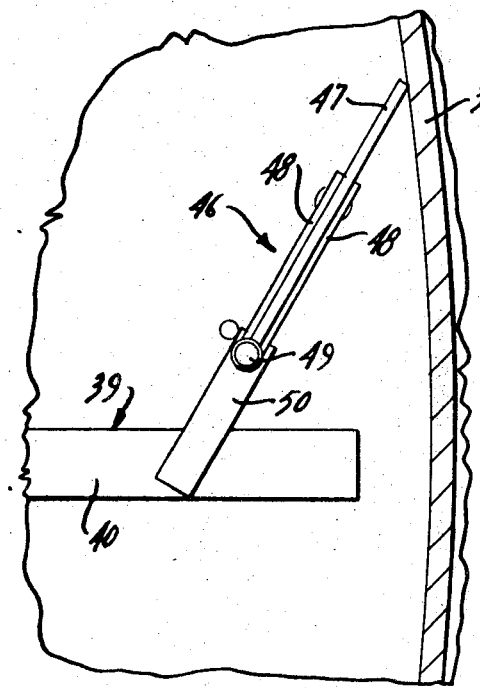
FIG_7
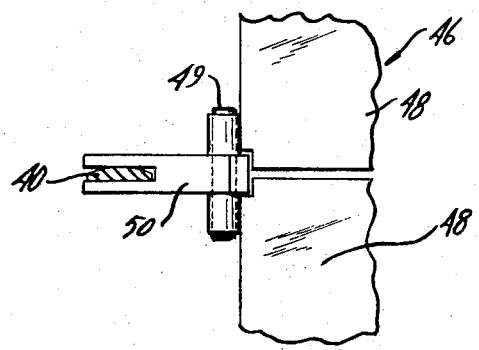
FIG_8
INVENTOR.
NORMAN J. PETERS
BY
*Andrus & Starke*
Attorneys Nov. 24, 1970      N. J. PETERS      3,541,687
VERTICAL CHEESE MAKING UNIT
Filed Feb. 26, 1968      4 Sheets-Sheet 4
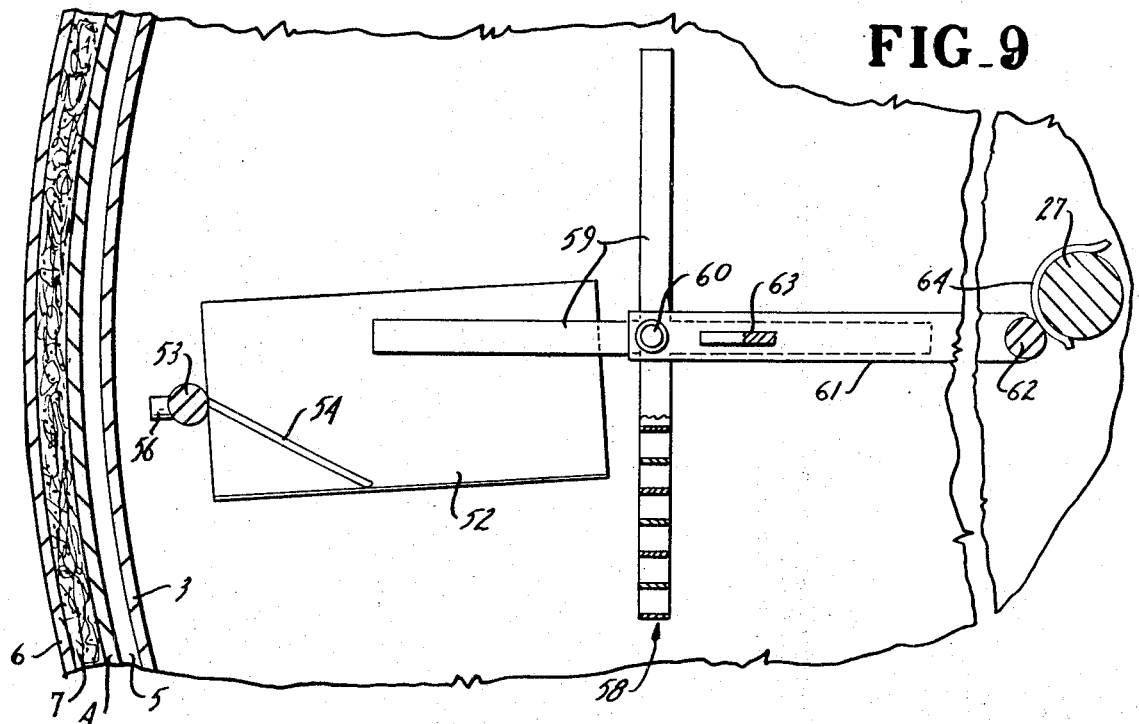
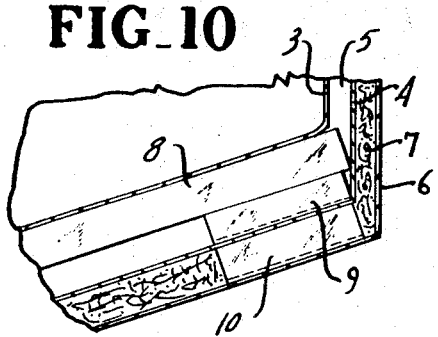
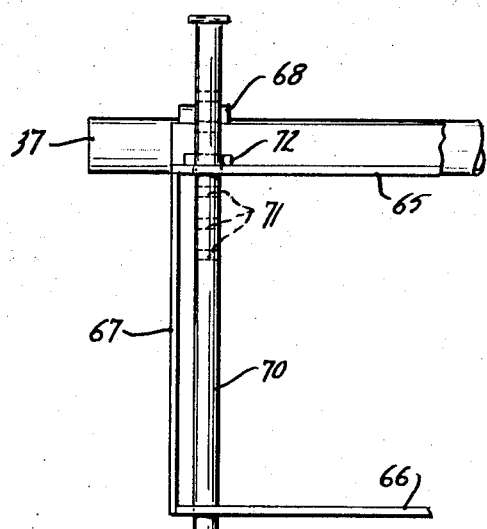
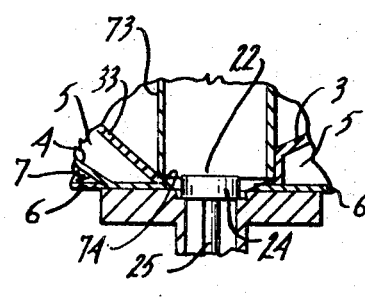
INVENTOR.
NORMAN J. PETERS
BY
Andrus & Starke
Attorneys

United States Patent Office 3,541,687
Patented Nov. 24, 1970

3,541,687
VERTICAL CHEESE MAKING UNIT
Norman J. Peters, Fond du Lac, Wis., assignor to Dairy Equipment Company, Madison, Wis., a corporation of Wisconsin
Filed Feb. 26, 1968, Ser. No. 708,068
Int. Cl. A01j 25/02
U.S. Cl. 31—47                     18 Claims

ABSTRACT OF THE DISCLOSURE

This invention relates to a vertical cheese making vat. The vat comprises a closed vessel having a central vertical shaft and a pair of agitator panels are connected to the lower end of the shaft. In addition, a pair of arms extend radially outward from the upper portion of the shaft and the arms are adapted to carry a series of implements used during the cheese making operation. The closed top of the vat is provided with an opening enclosed by a removable cover through which the implements are inserted and withdrawn from the vessel.

---

In the past, cheese making has been normally carried on in large open-top vats. Recently there has been increased activity in closed, vertical-type cheeese making vats which have decided advantages over the open-top vat. As the vertical vat is closed, a more sanitary design and construction is provided which decreases contamination, such as bacteriophage. The use of the vertical vat also reduces the necessary floor space and decreases operating labor on a group installation of vats. As a further advantage, the vertical cheese making vat permits maximum use of automatic controls and provides better control of product quality. Moreover, as the vertical vat is a closed unit, the vat itself, as well as the various implements used in the cheese making process can be cleaned in place in the vat after the cheese making operation. As the vertical vat is normally mounted in a through-the-floor arrangement, the curd and whey are drawn from the bottom of the vat and this minimizes air entrapment in the product.

The present invention is directed to an improved vertical cheese making vat. According to the invention, the vat comprises a closed vessel having a central vertical shaft which carries a pair of agitator paddles. In addition, a pair of arms extend outwardly from the upper end of the shaft and are adapted to carry a series of implements used during the cheese making operation. The implements can be inserted and withdrawn from the vat during various periods during the cheese making operation through an enclosed opening in the top of the vat.

The agitator paddles include support brackets or hooks which, during one phase of the cheese making operation, are adapted to receive the lower ends of curd cutting knives. The supporting hooks securely mount the lower ends of the knives to the agitator paddles and permit both forward and reverse rotation of the shaft and knives without the knives moving away from the paddles, thereby eliminating potential jamming of the knives against the vessel wall.

As an added feature, a resilient wiper blade is mounted on the vertical side edge of each of the curd cutting knives. The wiper blade rides along the side wall of the vat and directs the curd inwardly where it can be cut by the knives and removes any adherence of curd from the side walls so that better heat transfer to the product is obtained.

During the cooking operation, a rotatable breaker is suspended on the arms and rotates with the central shaft. The rotatable breaker is also arranged to rotate about its vertical axis, and the independent rotation of the breaker act to prevent an accumulation of curd within the cutting frame of the breaker. The rotating breaker cooperates with baffles mounted along the side wall of the vat, as well as with a liqid level paddle, to provide the desired agitation for the curd.

During the cooking operation, heat is supplied to the curd by steam which is introduced into a chamber or jacket surrounding the vat. A provision is also made to supply chilling water to the chamber during non-cooking periods, so that milk can be held in the vat for extended periods without spoiling.

As the vat has a closed top and a conical bottom, which converge to an outlet offset from the central axis of the vat, the vat can be readily cleaned in place after the cheese making operation. During the cleaning operation a provision is made to direct a small amount of the cleaning solution upwardly around the upper end of the central shaft and the cleaning solution is deflected by a drip guard and is collected in a trough from which the solution is conducted to a drain. Other objects and advantages will appear in the course of the following description.

The drawings illustrate the best mode presently contemplated of carrying out the invention.

In the drawings:

FIG. 1 is a side elevation of the vertical cheese making vat with parts broken away in section;

FIG. 2 is a plan view of the vat;

FIG. 3 is a side elevation with parts broken away in section and showing the curd cutting knives mounted in the vat;

FIG. 4 is a view similar to FIG. 3 and showing the rotatable breaker and baffles mounted in the vat;

FIG. 5 is an end view with parts broken away showing the lower end of the curd cutting knife being supported by the agitator paddle;

FIG. 6 is an enlarged vertical section showing the central shaft, drip guard and spray nozzle;

FIG. 7 is a horizontal section showing the scraper blade mounted on the curd cutting knife;

FIG. 8 is a fragmentary side elevation showing the scraper blade of FIG. 7;

FIG. 9 is a section taken along line 9—9 of FIG. 4 and showing the rotatable breaker and baffle;

FIG. 10 is an enlarged fragmentary vertical section of the lower end of the vat;

FIG. 11 is an enlarged side elevation of the support for the liquid level paddle; and FIG. 12 is an enlarged fragmentary vertical section of the riser tube as installed with the outlet in the vessel.

The drawings illustrate a vertical cheese making vat 1 which is mounted within an opening in a floor 2 or foundation. With this through-the-floor mounting, the upper portion of the vat is located at the upper level or second story of the building, while the lower portion of the vat extends downwardly to the lower level of the building or basement.

The vat 1 can be used for making various types of cheese, such as Swiss, Cheddar, Colby, granulated, Italian, and the like.

The vat 1 includes an inner vessel or tank 3 formed of stainless steel or the like, and a jacket 4 surrounds the vessel 3 with the space between the vessel 3 and the jacket 4 defining a heating chamber 5. An outer casing 6 is spaced around the jacket 4 and a suitable insulating material 7 is located within the space between jacket 4 and casing 6 to prevent heat loss to the atmosphere.

As best shown in FIG. 10, the lower, generally conical bottom surface of vessel 3 is spaced from the jacket 4 by a series of channel members 8 which extend from the outer periphery of the vessel to the center. In addition to channels 8, a series of shorter channels 9 are located between the channels 8 and the jacket 4. As also shown in FIG. 10, the jacket 4 is spaced from the outer casing 6 by a series of channel members 10.

During the cooking operation, a heating medium, such as steam, is introduced into the heating chamber 5. As shown in FIG. 1, a series of concentric spray rings 12, 13, and 14 are mounted in the chamber 5 beneath the bottom surface of the vessel 3. Steam is introduced to the large upper spray ring 12 through an inlet line 15, while steam is introduced to the central ring 13 through an inlet line 16 and steam is conducted from the ring 13 to the smaller lower ring 14 by a pair of connecting lines 17. Steam is ejected from the rings 12, 13, and 14 through a series of holes or nozzles 18 formed in the rings and the condensate flows down the conical bottom surface of the jacket 4 and is conducted to a drain through the oulet 19.

In some situations it may be desired to hold the milk in the vat 1 for an extended period such as, for example, over a weekend or a holiday. In order to hold the milk in the tank at a chilled temperature, a cooling inlet 20 is connected to the upper end of chamber 5, and a cooling medium, such as chilled water, is introduced into the chamber 5. An overflow outlet 21 communicates with the chamber 5 adjacent the lower end of the side wall of the tank and determines the maximum level of the chilling water in the chamber. In addition, an outlet 21a serves during the cooking operation to vent steam within the heating chamber. As the steam is normally at atmospheric pressure, the venting of the steam through line 21a does not affect the heating operation.

The curd and whey are drained from the vessel 3 through an outlet 22 which is located in the bottom of the vat and offset from the vertical axis of the vat. A fitting 23 is connected to the outlet 22 and defines a valve seat which is open and closed by a valve 24 carried by stem 25. The valve is opened and closed by an actuator mechanism 26 which can be either automatically or manually controlled.

Located centrally within the vat 1 is a drive shaft 27, and the lower end of the shaft is journalled within a bearing block 28 mounted on the bottom surface of the vessel 3. The upper end of the shaft 27 extends through an opening in the upper end of the vat and is connected to a speed reducing mechanism 29 which is driven by a motor 30 through a belt drive contained within the housnig 31. With this construction the motor 30 operates through the speed reduction mechanism 29 to rotate the shaft 27 about its axis.

The motor and speed reducing unit 29 are supported on the upper end of the vat 1 by a pair of generally parallel supports 32 which extend diametrically across the vat and by a support 33 which is located normal to the supports 32.

Access to the interior of the vat 1 is obtained through an opening in the upper surface which is enclosed by a removable cover 34. As best shown in FIG. 2, the cover extends from the periphery of the vat inwardly toward the center and has a length generally greater than the radius of the vat so that various implements used in the cheese making operation can be inserted and withdrawn through the opening. While the drawing shows the opening in the top of the vat extending from the peripheral edge to the center in some instances, the opening may extend completely across the vat.

A pair of agitator paddles 35 are connected to the lower end of the shaft 27 and are adapted to rotate with the shaft. Paddles 35 extend upwardly at an inclined angle and are generally parallel to the conical bottom surface of the vessel 3. Braces 36 extend between the outer ends of the paddles 35 and the central shaft 27.

In addition to paddles 35, the shaft 27 also carries a pair of radially extending arms 37 from which a series of cheese making implements are suspended during various periods of the cheese making operation. As shown in FIG. 3, a pair of curd cutting knives 38 and 39 are suspended from the arms 37. Each curd cutting knife is provided with a generally rectangular frame 40 and a series of wires 41 are mounted in spaced relation on the frames. As shown in FIG. 3, the wires 41 of the knife 38 extend horizontally, while the wires 41 of the knife 39 extend vertically. As the knives 38 and 39 rotate with the shaft 27, the knives will serve to cut the curd into small rings which are then cut into smaller pieces.

The upper ends of the knives 38 and 39 are suspended from the arms 37 by hooks 42 which extend upwardly from the frames 40 and are engaged with the arms. Each arm is provided with a projection 43 adjacent the shaft 27 which acts to position the knives on the arms.

The lower ends of the knives 38 and 39 are attached to the paddles 35 by means of a pair of hooks 44 which extend upwardly in spaced relation from each paddle. Each hook is provided with a downwardly bent outer end 45. As best shown in FIG. 5, the lower end of each cutter knife is received within the space between the hook 44 and the corresponding paddle 35. This attachment permits both forward and reverse rotation of the cutter knives without the knives being displaced from the paddles. When the paddle is rotated forwardly in the direction of the arrow in FIG. 5, the paddle itself will engage the knife to push the knife ahead of it. However, in some instances it may be desired to reverse the rotation of the cutter knives to increase the fineness of cutting, or to move the knife to a position beneath the opening in the top of the vat where it can be removed. As the curd is relatively heavy and viscous, the lower end of the knife may tend to move away from the paddle on reverse rotation and can jam against the wall of the vessel. In addition, after forward rotation and when the paddle 35 is stopped, the inertia of the heavy rotating curd may tend to push the lower end of the knife away from the paddle. However, the hooks 44 act to prevent displacement of the knives from the paddles and will maintain the lower ends of the knives in engagement with the paddles at all times.

A provision is also made to scrape the curd from adjacent the wall of the vessel 3 inwardly so that the curd will be cut by the knives 38 and 39 as the knives are rotated. The scraper blade assembly 46 which performs this function is best shown in FIGS. 7 and 8, and includes a resilient blade 47 made of rubber or the like, which ride against the side wall of the vessel 3. The blade 47 is mounted between a pair of plates 48 and the inner ends of the plates are connected by hinges 49 to a series of brackets 50 mounted on knife frame 40. As shown in FIG. 5, the resilient blade 47 is located at an angle to the plane of the knife and is disposed ahead of the knife, with respect to the direction of rotation. Blade 47 acts to ride along the surface of the wall and scrape the curd inwardly where it can be cut by the rotating knife. The connection of the hinges 49 with the brackets 50 permits pivotal movement of the blade toward the plane of the knife, but prevents pivotal movement of the scraper blade in the opposite direction.

During the initial mixing of the milk, rennet and starter, as well as during the cooking period, a pair of angularly disposed baffles 51 and 52 are located in the vessel 3 along the side wall. Baffle 51 is spaced above the baffle 52 and the baffles act in conjunction with the agitator paddles 35 to lift the curd and provide the desired circulation of the curd within the vessel. Each of the baffles 51 and 52 is carried by a vertical rod 53 and the baffles are reinforced by braces 54 which are connected between the inclined baffle and the rod. The rods 53 are adapted to be positioned in guideways 55 attached to the side wall of the vessel and a plastic wear button 56 made of nylon or the like, is secured to the lower end of each rod and aids in sliding the rods up and down along the wall of the vessel 3.

As shown in FIG. 4, each of the rods 53 is provided with a hooked upper end 57. The hooked end 57 does not provide any function during the cheese making operation, for the hook extends inwardly toward the center of the vat. However, during the clean-in-place operation, the hooks 57 are supported from the arms 37 in the vessel 3 so that the baffles 51 and 52 can be sanitized during the cleaning operation.

During the manufacture of Swiss and similar types of cheese, a rotating breaker paddle 58 is utilized during the cooking operation. As best shown in FIG. 4, the breaker paddle 58 is positioned in a plane between the baffles 51 and 52, and the breaker paddle 58 not only rotates with the shaft 27 but also rotates about its own axis.

The breaker paddle 58 comprises a pair of vertical wire frames or blades 59 which are disposed normal to each other and are mounted on a central vertical shaft 60. Shaft 60 is journaled for rotation between a pair of parallel horizontal arms 61 which extend outwardly from rods 62. Braces 63 connect the rods 62 with the arms 61. To maintain the lower end of the rod 62 in position with respect to the central shaft, the lower end of the rod carries a generally curved shoe 64 which partially surrounds the shaft 27, as shown in FIG. 9.

The upper end of the rod 62 carries a pair of arms 65 and 66 which are disposed generally parallel to each other, as shown in FIGS. 4 and 9, and the outer ends of the arms 65 and 66 are connected by an end bar 67. Hooks 68 extend upwardly from arms 65 and are adapted to engage the arms 37 which extend outwardly from shaft 27 to support the breaker assembly within the vessel 3.

Arms 65 and 66 support a generally curved paddle 69 which is located approximately at liquid level. The paddle 69 rotates with shaft 27 and serves to agitate and aerate the liquid. Aeration is desirable when manufacturing Swiss and similar cheeses. Paddles 69 are supported by rods 70 which extend through aligned openings in the arms 65 and 66. Rods 70 are provided with a series of holes 71 and a pin 72 can be inserted through one of the holes 71 to thereby provide a vertical adjustment for the position of the paddle 69. The adjustment is desirable because the solids content of the milk may vary depending on the dairy cattle feed at a particular time of the year. As the vat is filled with the corresponding volume of milk for a given cheese yield at various times throughout the year, the adjustment provided by holes 71 enables the paddle 69 to be located aproximately at liquid level.

During the manufacture of Swiss and other similar types of cheese, it is desirable to drain a portion of the whey from the vat. To do this, a riser or drain tube 73 is inserted through the opening in the top of the vat and the lower end of the tube 73 is inserted against the inclined surface 74 bordering the valve seat. Tube 73 is spaced outwardly from the drain opening 22, as shown in FIG. 12, so that the valve 24 can be opened and closed with the tube 73 in place. By opening the valve 24, the whey above the level of the top of the tube 73 will drain through the tube to the outlet 22.

As the drain opening 22 is offset from the axis of the vat, the tube 73 can be conveniently inserted through the opening in the top of the vat and installed with the outlet 22. The offset outlet 22 has a further advantage in that it prevents a vortex from forming during the draining operation and also prevents air entrapment in the liquid being drained from the vat.

As previously mentioned, the vessel 3 is adapted to be cleaned in place after the cheese making operation. In this regard, a pair of spherical nozzles 75 are mounted beneath the top surface of the vessel 3, as shown in FIG. 6, and conduits 76 connect the nozzles 75 to a supply of washing solution. Each of the nozzles is provided with a plurality of outlets or jets 77 which direct the washing solution to all portions of the interior of the vessel.

During the cleaning operation, the various implements such as the cutter knives 38 and 39, the baffles 51 and 52, as well as the rotatable breaker assembly can be mounted on the arms 37 and the washing solution being discharged from nozzle 75 will not only clean the interior surface of the vessel 3, but will also clean the various implements suspended from the arms 37.

A series of the outlets 77 of nozzles 75 are directed toward the upper end of the shaft 27 which normally is a difficult area to adequately sanitize during the cleaning operation. As best shown in FIG. 6, the upper end of the shaft 27 is provided with a drip shield 78 which extends outwardly at a downwardly inclined angle from the shaft. The outer margin of the drip shield 78 extends outwardly beyond the upstanding flange 79 on the vessel 3 which surrounds the shaft 27. The inner wall of an annular trough 80 is secured flatwise against the flange 79 and any washing solution directed upwardly through the space between shaft 27 and flange 79 is directed downwardly by the drip shield 78 and is collected within the trough 80. Trough 80 is provided with an outlet 81 which is connected by suitable tubing to a drain. The drip shield construction enables the upper end of the shaft to be conveniently cleaned during the clean-in-place operation.

In a typical cheese making process, the milk, starter and rennet are added to the vessel 3. The baffles 51 and 52 are positioned within the tank and the shaft 27 is rotated to thereby rotate the paddles 35. The paddles, in combination with the baffles 51 and 52 thoroughly mix the ingredients as well as lifting the milk upwardly in the desired circulatory pattern.

Following the mixing operation, the agitator paddles 35 are reversed in direction of rotation to obtain a dormant or quiescent condition for the milk.

The baffles 51 and 52 are then removed from the vessel and the cutting knives 38 and 39 are installed. Usually the knives are rotated about 1¼ revolutions and the knife 38 is then removed. The cutting knife 39 is then reversed one revolution and moved forward one-half revolution to a position beneath the opening in the top of the vat where it can be removed.

After a rest period of about 7 to 10 minutes, the baffles 51 and 52 are again installed and the curd is agitated at a speed slowly advancing from 10 r.p.m. to 14 r.p.m.

Following the agitation, steam is introduced into the steam chamber and the curd is cooked for a period of about 35 minutes up to a temperature of 103° F. or higher depending upon the type of cheese.

Following the cooking, the curd is permitted to rest for a short period of about a minute, and in the manumacture of Swiss and similar types of cheese a portion of the whey is then drawn off.

Subsequently the valve 24 is opened and the curd and whey is discharged from the vessel 3 through outlet 22 to a finishing vat.

In some forms of cheese making such as Swiss and similar types, the breaker paddle 58 is installed during the cooking operation. As the shaft 27 rotates, the breaker paddle rotates slowly about the axis of the vat, as well as rotating slowly about its own axis. The free rotation of the breaker paddle 58 serves to prevent the curd from adhering to the frames 59 of the breaker paddle.

The vertical cheese making vat of the invention substantially reduces the floor space necessary for a single vat as compared to an open-top vat as well as reducing the floor space and the operating labor for a group installation. Furthermore, as the vat is insulated and is provided with a closed top, little heat is radiated to the exterior and this not only improves the efficiency of the cooking operation, but also prevents the build up of heat in the plant itself.

As the cheese making vat is closed during the cheese making process, a more sanitary operation is achieved, thereby minimizing contamination such as bacteriophage. Furthermore, the closed nature of the vat enables the vat to be readily cleaned-in-place, and the various implements, such as the cutter knives, rotary breaker, etc. can be suspended from the arms 37 and sanitized along with the vessel 3 during the clean-in-place operation.

The chamber surrounding the vessel not only is used as a heating chamber during the cooking operation, but during periods of non-cooking can receive a chilling medium which enables the milk to be stored in the vat for extended periods without spoilage.

Various modes of carrying out the invention are contemplated as being within the scope of the following claims particularly pointing out and distinctly claiming the subject matter which is regarded as the invention.

I claim:

1. In a cheese making apparatus a closed vessel having a closed top and having an opening in the top extending from the periphery of the vessel to adjacent the center thereof, a door to removably close the opening in the top, a vertical shaft disposed axially of the vessel, drive means mounted on the top and operably connected to the shaft for rotating the shaft about its axis, agitating means extending outwardly from the lower end of the shaft, support means extending outwardly from the upper end portion of the shaft, a cheese making implement to be inserted and withdrawn through said opening and suspended from said support means, and means associated with said agitator means for holding the bottom end of said implement and preventing lateral movement of said curd cutting means with respect to said agitator means.

2. The apparatus of claim 1 wherein said cheese making implement comprises a frame and a series of generally parallel wires secured to said frame.

3. The apparatus of claim 2, and including hook means on the upper end of said frame and disposed to engage said support means.

4. The apparatus of claim 1, and including a jacket surrounding said vessel and spaced from the vessel to provide a chamber therebetween, heating means including a series of generally annular conduits located within the chamber beneath the vessel, means for supplying heating medium to said conduits, said conduits being provided with a series of spaced openings through which said heating medium is discharged into said chamber, and cooling means for supplying a cooling medium to said chamber during non-heating periods.

5. The apparatus of claim 4, wherein said cooling means comprises an inlet conduit connected to the upper portion of said chamber, and said apparatus includes overflow conduit means connected to the chamber at a location beneath said inlet conduit means.

6. In a cheese making apparatus, a vessel, a vertical shaft disposed axially of said vessel, means for rotating said shaft about its axis, agitating means extending outwardly from the lower end of the shaft, support means extending outwardly from the upper end portion of the shaft, a cheese-making implement suspended from said support means, holding means associated with the agitator means for holding the bottom end of said implement and preventing lateral movement of said implement with respect to said agitator means, and a resilient wiper member extending outwardly from the vertical outer side edge of said implement and disposed in engagement with the wall of the vessel, said wiper member being disposed to deflect the curd adjacent the wall inwardly to a position where it can be engaged by said implement.

7. The apparatus of claim 6, wherein said cheese making implement is generally flat and is suspended vertically within the vessel, and said wiper member extends at an angle to the plane of said implement.

8. The apparatus of claim 7, wherein said wiper member extends at an angle forwardly from said implement in the direction of rotation of said implement.

9. In a cheese making apparatus, a generally closed vessel having an opening in the upper surface thereof, a vertical shaft disposed axially of the vessel, said shaft extending through an opening in the upper surface of said vessel, means for rotating said shaft about its axis, spray nozzle means disposed within the vessel, means for supplying a cleaning solution to said spray nozzle means with said solution being discharged from said nozzle means into the interior of said vessel, and shielding means disposed around said shaft and located outwardly of the vessel for directing the solution outwardly of said shaft to a location of collection.

10. The apparatus of claim 9, wherein said nozzle means is located adjacent the upper surface of said vessel.

11. The apparatus of claim 9, and including collection means disposed on the exterior of the vessel and located outwardly of said opening, said shielding means being arranged to direct said solution outwardly into said collection means.

12. The apparatus of claim 9, wherein the upper surface of said vessel is provided with a flange bordering said opening, said flange being spaced outwardly from said shaft, said shielding means comprising a downwardly and outwardly extending shield with the periphery of said shield extending radially beyond said flange, and a trough located on the outside of said flange and beneath the periphery of said drip shield to receive the solution dripping from said shield.

13. In a cheese making apparatus, a vessel, a vertical shaft disposed axially of the vessel, means for rotating the shaft about its axis, agitator means extending outwardly from the lower end of the shaft, support means extending outwardly from the upper end of the shaft, a frame suspended from said support means, a rotatable breaker member carried by the frame and mounted for rotation with respect to said frame about a vertical axis, said breaker means being located between said agitator means and said support means, and baffle means extending inwardly from the side wall of the vessel and spaced vertically from said breaker means.

14. The apparatus of claim 13, and including means for adjusting the height of said paddle means with respect to said frame.

15. The apparatus of claim 13, wherein said baffle means is mounted on a vertical rod disposed adjacent the wall of the vessel, and said apparatus includes means for attaching the upper end of the rod to the wall of the vessel.

16. The apparatus of claim 15, wherein said baffle means comprises a pair of baffles with one of said baffles being located above said breaker means and the other of said baffles being located beneath said breaker means, said baffles being dsiposed at an acute angle with respect to the vertical.

17. In a cheese making appartus, a vessel, a vertical shaft disposed axially of said vessel, means for rotating said shaft about its axis, agitating means extending outwardly from the lower end of the shaft, support means extending outwardly from the upper end portion of the shaft, a cheese making implement suspended from said support means, and a hook member extending outwardly and upwardly from the agitating means to provide a recess between the hook member and said agitating means, the lower end of said cheese making implement being received within said recess.

18. In a cheese making apparatus, a vessel, a vertical shaft disposed axially of the vessel, means for rotating the shaft about its axis, agitator means extending outwardly from the lower end of the shaft, support means located within the vessel and extending outwardly from the upper end of the shaft and disposed to rotate with said shaft, a frame suspended from said support means and fixed with respect to said support means, a freely rotatable breaker member carried by the frame and mounted for rotation with respect to said frame about a vertical axis, said breaker means being located between said agitator means and said support means, and paddle means carried by the frame and located above said breaker means and fixed with respect to the frame, said paddle means being positioned beneath said support means and adapted to agitate the surface of the liquid on rotation of the shaft.

References Cited

UNITED STATES PATENTS

| | | | |
|---|---|---|---|
| 1,044,851 | 11/1912 | Behm | 31—48 |
| 1,046,906 | 12/1912 | Veeman | 31—47 |
| 2,166,753 | 7/1939 | Derleth | 31—47 |
| 2,663,081 | 12/1953 | Hensgen | 31—48 |
| 2,814,114 | 11/1957 | Nessler et al. | 31—46 X |
| 3,019,527 | 2/1962 | McReavy | 31—46 X |

HUGH R. CHAMBLEE, Primary Examiner